US008894415B2

(12) United States Patent
Best et al.

(10) Patent No.: US 8,894,415 B2
(45) Date of Patent: Nov. 25, 2014

(54) SYSTEM, METHOD AND APPARATUS FOR DRIVER TRAINING

(75) Inventors: Aaron M. Best, Murray, UT (US); J Ken Barton, Sandy, UT (US); David J Havell, Salt Lake City, UT (US); Reginald T. Welles, Salt Lake City, UT (US); Darrell R. Turpin, Murray, UT (US); James W. Voorhees, Vancouver, WA (US); John E. Kearney, St. Pete Beach, FL (US); Camille B. Price, Kaysville, UT (US); Nathan P. Stahlman, Vancouver, WA (US); Aaron J. Turpin, Taylorsville, UT (US); Aaron M. Purvis, Vancouver, WA (US)

(73) Assignee: Advanced Training System LLC, St. Petersburg, FL (US)

( * ) Notice: Subject to any disclaimer, the term of this patent is extended or adjusted under 35 U.S.C. 154(b) by 461 days.

(21) Appl. No.: 12/889,451

(22) Filed: Sep. 24, 2010

(65) Prior Publication Data
US 2011/0076650 A1    Mar. 31, 2011

Related U.S. Application Data

(60) Provisional application No. 61/277,768, filed on Sep. 29, 2009.

(51) Int. Cl.
G09B 9/04 (2006.01)
G09B 9/05 (2006.01)
(52) U.S. Cl.
CPC ....................................... G09B 9/05 (2013.01)
USPC .............................................. 434/65; 434/69

(58) Field of Classification Search
USPC ............. 434/62, 65, 69, 71, 29, 30; 463/6, 23
See application file for complete search history.

(56) References Cited

U.S. PATENT DOCUMENTS

| | | | |
|---|---|---|---|
| 3,309,794 A | 3/1967 | Greenshields | |
| 3,479,750 A | 11/1969 | Swanson | |
| 3,583,079 A | 6/1971 | Koci | |
| 3,611,589 A | 10/1971 | Wiltse | |
| 3,936,955 A | 2/1976 | Gruen | |
| 4,464,117 A | 8/1984 | Foerst | |
| 5,116,051 A * | 5/1992 | Moncrief et al. | ............... 463/36 |
| 5,366,376 A | 11/1994 | Copperman | |
| 5,399,091 A | 3/1995 | Mitsumoto | |
| 5,577,913 A * | 11/1996 | Moncrief et al. | ............... 434/69 |
| 5,626,362 A | 5/1997 | Mottola | |
| 5,707,237 A | 1/1998 | Takemoto | |
| 5,823,876 A | 10/1998 | Unbehand | |
| 5,921,780 A | 7/1999 | Myers | |

(Continued)

Primary Examiner — Peter Egloff
(74) Attorney, Agent, or Firm — Larson & Larson, P.A.; Frank Liebenow; Justin P. Miller

(57) ABSTRACT

An application for a system for driver training is includes a computer with at least two graphics displays. A first graphics display simulates a windshield of a target vehicle and a second graphics display simulates a dashboard of the target vehicle. The computer generates images that simulate the dashboard of the target vehicle on the second graphics display. A touch screen interface is connected to the second graphics display and is operatively coupled to the computer thereby signaling the computer with positions of which the second graphics display is touched by a trainee. The trainee is prompted to touch an item on the dashboard (second graphic display) and the touch screen interface is read to determine if the trainee touched the appropriate item (e.g. gauge).

17 Claims, 12 Drawing Sheets

(56) References Cited

U.S. PATENT DOCUMENTS

| | | | |
|---|---|---|---|
| 5,951,018 A | 9/1999 | Mamitsu | |
| 6,105,737 A | 8/2000 | Weigert | |
| 6,227,862 B1 | 5/2001 | Harkness | |
| 6,270,350 B1 | 8/2001 | Christopher | |
| 6,431,872 B1 | 8/2002 | Shiraishi | |
| 6,916,074 B2 | 7/2005 | Jung | |
| D531,221 S | 10/2006 | Shiraishi | |
| 7,625,287 B2 | 12/2009 | Champagne | |
| 2002/0146667 A1* | 10/2002 | Dowdell et al. | 434/62 |
| 2003/0211448 A1* | 11/2003 | Quimper et al. | 434/219 |
| 2004/0158476 A1 | 8/2004 | Blessinger | |
| 2004/0259059 A1 | 12/2004 | Aoki | |
| 2006/0040239 A1 | 2/2006 | Cummins | |
| 2008/0064014 A1 | 3/2008 | Wojtczak | |
| 2008/0082372 A1 | 4/2008 | Burch | |
| 2009/0098519 A1* | 4/2009 | Byerly | 434/247 |
| 2009/0163283 A1 | 6/2009 | Childress | |
| 2009/0306880 A1 | 12/2009 | Gomi | |

\* cited by examiner

SYSTEM, METHOD AND APPARATUS FOR DRIVER TRAINING

CROSS-REFERENCE TO RELATED APPLICATION

This application is a non-provisional application taking priority from U.S. patent application Ser. No. 61/277,768 filed Sep. 29, 2009, the disclosure of which is hereby incorporated by reference. This application is related to U.S. application titled, "System and Apparatus for Driver Training," which was filed on even date herewith. This application is related to U.S. application titled, "System, Method and Apparatus for Driver Training of Shifting," which was filed on even date herewith.

FIELD

This invention relates to the field of training and more particularly to a system that aids in the teaching of dashboard operations.

BACKGROUND

Driving training simulators are well known. Such simulators often included controls that simulate the target vehicle (e.g. car, truck, bus, etc). It is known that such simulators improve skills and safety by familiarizing the trainee with operation of the vehicle by presenting simulated situations in which, making the wrong decision does not result in a potential accident or bodily harm. In this way, the trainee learns basic driving skills before they eventually need to perform using the actual target vehicle and before they have to perform using that vehicle while operating traffic.

There are many types of simulators known. The simplest simulator is a typical driving video game having a display screen and a hand controller. In some systems, a simulated steering wheel is provided. A mock-vehicle is displayed on the display screen and the driver uses the hand controller to keep the mock-vehicle on a simulated, moving roadway on the display screen. This type of simulator helps build driver hand and eye coordination, but does not provide the true control operation of the real steering wheel, brake, clutch, shifter, windshield views and mirror views. Such simulators are more of a game than an actual driver training system.

Another type of simulator includes a video display screen to simulate a windshield view, a steering wheel, a gas pedal, a brake pedal, a shifter and, optionally, a clutch pedal. A road situation is displayed on the display screen and the driver uses the controls to drive the simulated vehicle, moving down a roadway that is displayed on the display screen. This type of simulator helps build driver skills, but does not include interaction with speedometers, tachometers, etc. Such simulators don't provide feedback from the shifter such as gear grinding when the clutch isn't operated correctly. Furthermore, such simulators have a fixed configuration relating to a single type/layout of vehicle. In some such simulators, certain gauges are provided to simulate the operation and information provided to a driver of this singular vehicle. All current simulators provide fixed scenarios to the trainee and evaluate the trainee responses in a fixed program, progressing from scenario to scenario in a linear progress.

Some training simulators provide a mock-dashboard that simulates a particular vehicle. For example, a simulator may provide a dashboard that mimics the dashboard of a particular vehicle (e.g. truck). In this, actual gauges, indicators and displays are in fixed positions of the mock-dashboard. The indicators function as in the target vehicle such as indicate speed, engine RPM, water temperature, etc, but there are several weaknesses to this type of system. There is no way to reorganize such a mock-dashboard to mimic or at least be similar to a different target vehicle. Since many driver/operator training programs often train the driver/operator to operate multiple vehicles, such a system requires multiple training systems, one for each target vehicles. Another weakness lies in the fact that such a mock-dashboard is a one-way interface—the trainee gets information from the mock-dashboard, but there is no way to get information from the trainee. In many situations, data/concurrence is needed to assure the training system that the trainee has a good understanding of the gauges, indicators and displays. It is advantageous to know if the trainee is capable of identifying each of the gauges, indicators and displays. For example, if the trainee is having difficulty shifting because he/she is shifting at too low of an RPM, the training system is able to prompt the trainee to ask if he/she knows the location of the tachometer, but there is now way for the training system to receive feedback such as a signal indicating that the trainee has touched the tachometer.

What is needed is a driver training system that provides a configurable dashboard that, under computer control, portrays any of many different dashboards of target vehicles.

SUMMARY

In one embodiment a system for driver training is disclosed including a computer with at least two graphics displays. A first graphics display simulates a windshield of a target vehicle and a second graphics display simulates a dashboard of the target vehicle. The computer generates images that simulate the dashboard of the target vehicle on the second graphics display. A touch screen interface is connected to the second graphics display and is operatively coupled to the computer thereby signaling the computer with positions of which the second graphics display is touched by a trainee.

In another embodiment, a method of training a trainee regarding a dash board layout is disclosed. The method includes providing a training system that has a computer, a dashboard graphics display, an information graphics display and a windshield graphics display. The dashboard graphics display includes a touch screen interface that is operatively coupled to the computer, thereby sending signals to the computer indicative of where a touch is made on the dashboard graphics display. The method includes displaying a plurality of icons on the dashboard graphics display. The icons represent gauges, indicators and/or data of a dashboard of a target vehicle. Next, the computer prompts for a trainee to touch one of the icons by a message on the information graphics display then reads a set of coordinates from the touch screen interface corresponding to a location of the dashboard graphics display touched by the trainee. The set of coordinates is compared to a location of the icon on the dashboard graphics display and it is determined if the trainee touched the correct icon, thereby determining if the trainee understands the difference between the icons.

In another embodiment, a system for driver training is disclosed including a computer with at least two graphics displays. A first graphics display simulates a windshield of a target vehicle and a second graphics display simulates a dashboard of the target vehicle. The computer generates images on the second graphics display that simulate the dashboard of the target vehicle. The system includes a way to determine where a trainee touches the second graphics display. This is operatively coupled to the computer thereby signaling the computer with coordinates of where the second graphics display is touched by the trainee.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
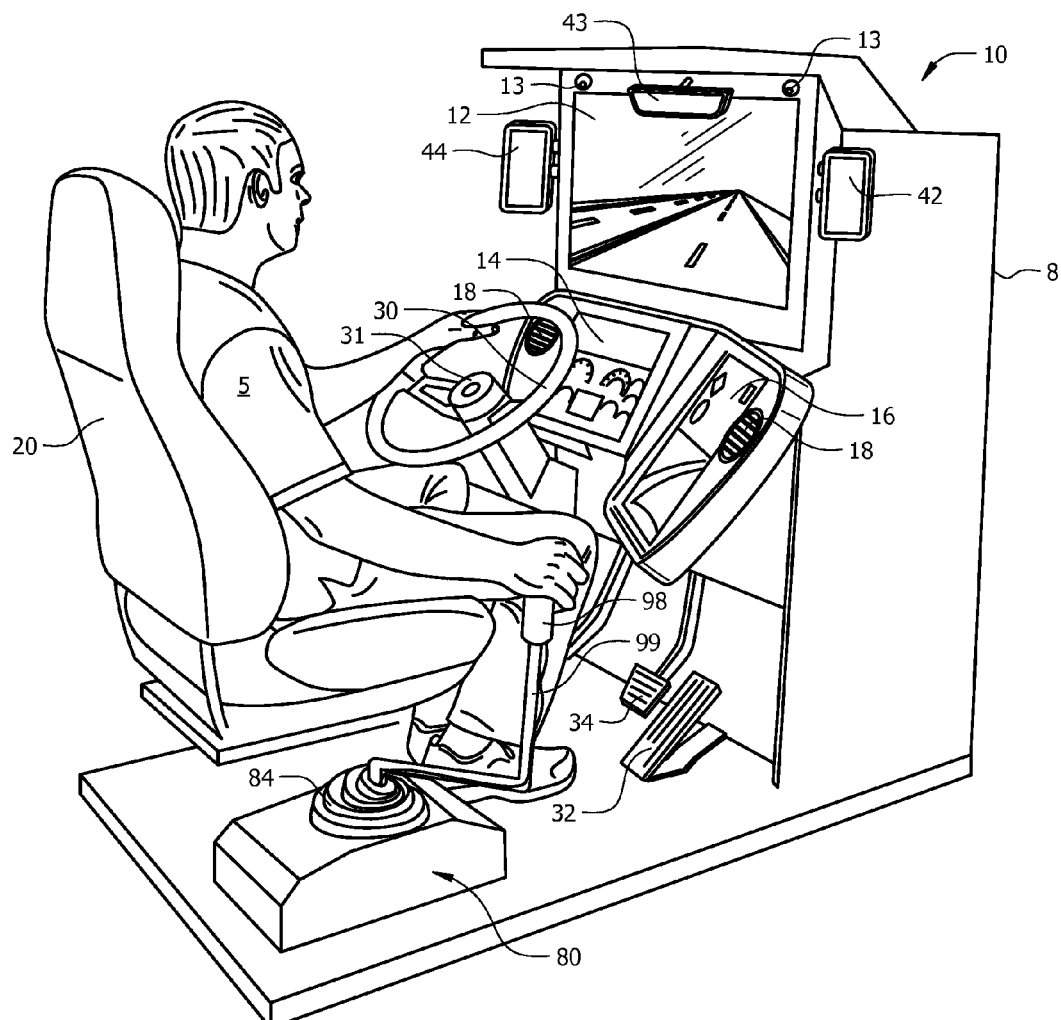
FIG. 1 illustrates a perspective view of a training system.

Reference will now be made in detail to the presently preferred embodiments of the invention, examples of which are illustrated in the accompanying drawings. Throughout the following detailed description, the same reference numerals refer to the same elements in all figures. In general, the training system 10 is often known as a driving/flying/boating/engineering/etc simulator, depending upon the target vehicle (car/truck, airplane, boat, train, etc). The training system 10 is any system for training a trainee (e.g. truck driver trainee) that simulates some or all of the operator controls (e.g. steering, brake, shifter) and visuals (e.g. mirrors, windows, dash boards, etc) without requiring the trainee to operate the actual vehicle (e.g., drive the actual truck). Although not limited to any particular target vehicle, the remainder of this description will use a truck as an example of such target vehicle for brevity reasons. Note that some of the controls described (e.g. shifter, clutch, steering wheel) are related to certain types of target vehicles and not necessarily to others. For example, many automobiles have automatic transmissions and, therefore, do not have a clutch. In another example, an airplane does not have rear-view mirrors, shifters, clutches, etc. Likewise, a truck driving simulator has rear-view mirrors, shifters, clutches, but does not have airelons, thrust, altitude gauges, etc.

Referring to FIG. 1, a perspective view of a training system 10 is shown. The training system 10 is supported and/or housed by/in a cabinet 8. The training simulator 10 provides life-like training without or before operation of the target vehicle, in this example a vehicle such as a truck or an automobile.

The exemplary training system 10 has a windshield display 12 on which a simulated driving situation is presented as the trainee 8 would see through the windshield of the target vehicle. The windshield display 12 shows, for example, the road being driven upon, the grade of the road, obstacles such as other vehicles, tress, parked cars, pot holes, etc. In some training scenarios, the windshield is fogged or distorted by simulated weather condition s such as rain, snow, sleet, etc.

The trainee 5 typically sits on a seat 20 that, preferably, though not required, mimics a seat of the target vehicle. The trainee has controls similar to those in the target vehicle such as a steering wheel 30, horn 31, gas pedal 32, brake pedal 34, clutch 36 (see FIG. 2), and shifter having a shifter shaft 99 and a shifter handle 98 and shifter sub-system 80. The shifter subsystem is often covered with a boot 84 to keep dust, liquids, etc from damaging the working components.

In a preferred embodiment, though not required, the steering wheel 30 and shift handle 98 have touch sensors that detect if and when the trainee 5 has is grasping the steering wheel 30 and/or shift handle 98. The touch sensors are any known touch sensor such as a mechanical switch or switches, capacitive or resistive detectors, etc. In some embodiments, the position of the trainee's hands is determined by the camera(s) 13 in conjunction with or instead of the touch sensors.

In some embodiments, a force or strain detector 123 (see FIG. 8) is coupled to the shifter arm 99. The strain detector 123 provides information to determine how hard the trainee 5 is pushing or pulling the shifter handle 98.

Figure 3:
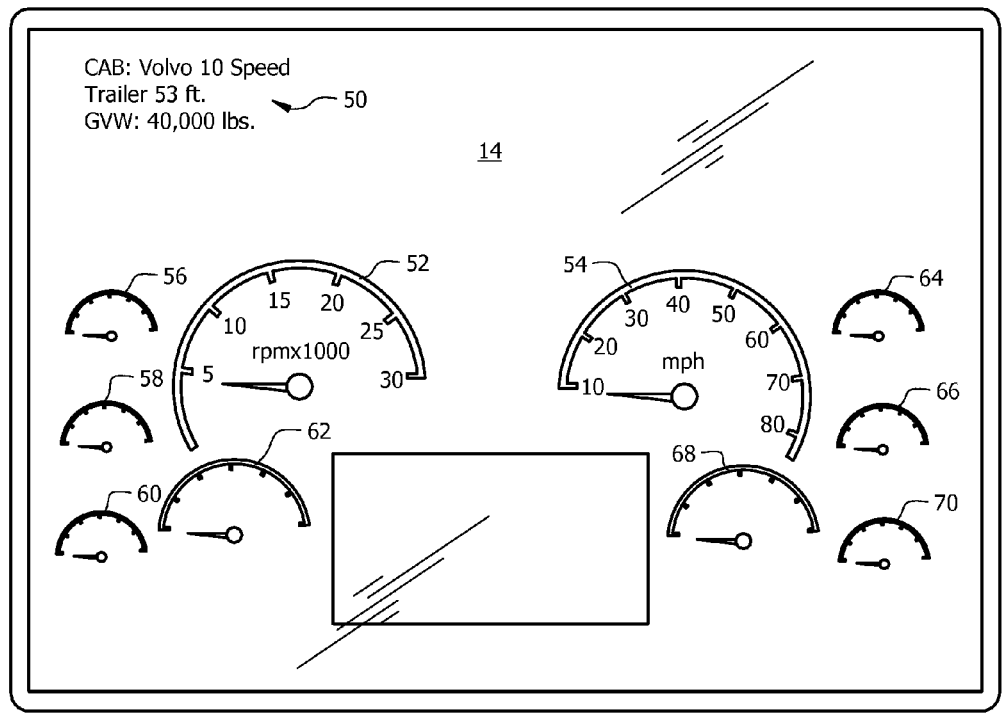
FIG. 3 illustrates a plan view of a training system dashboard.
Figure 4:
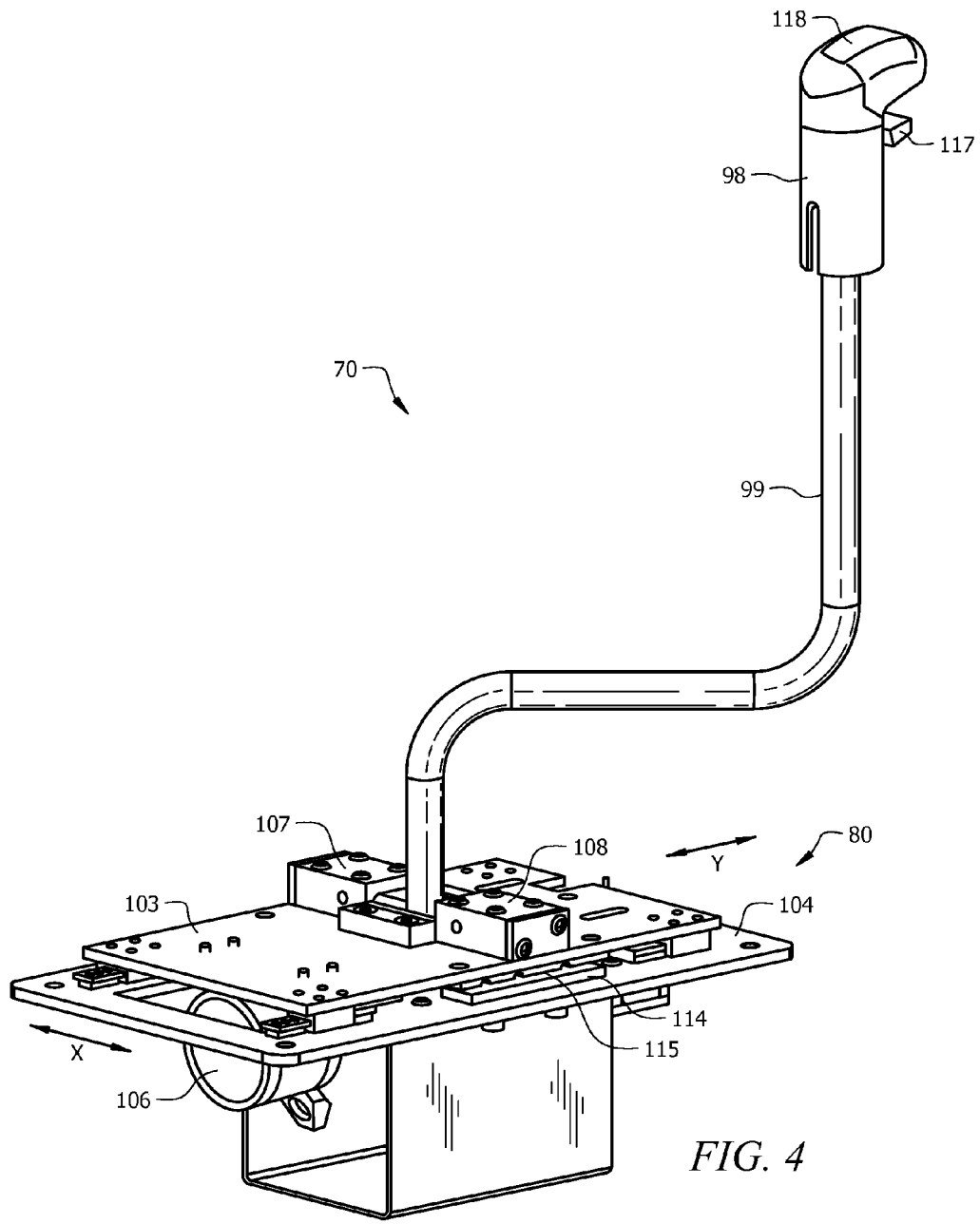
FIG. 4 illustrates a perspective view of a shifting training sub-system.
Figure 5:
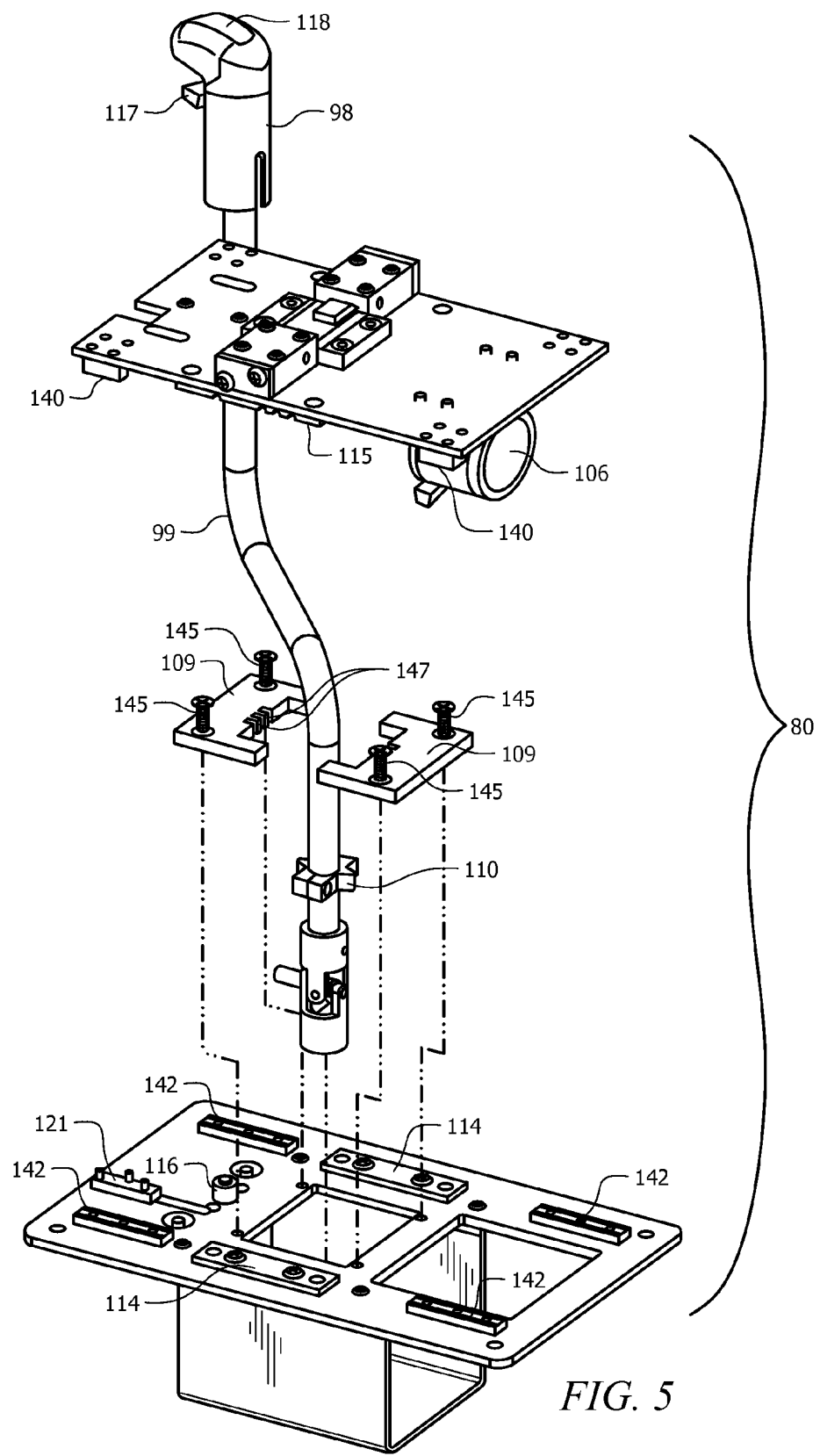
FIG. 5 illustrates an exploded view of the shifting training sub-system.
Figure 6:
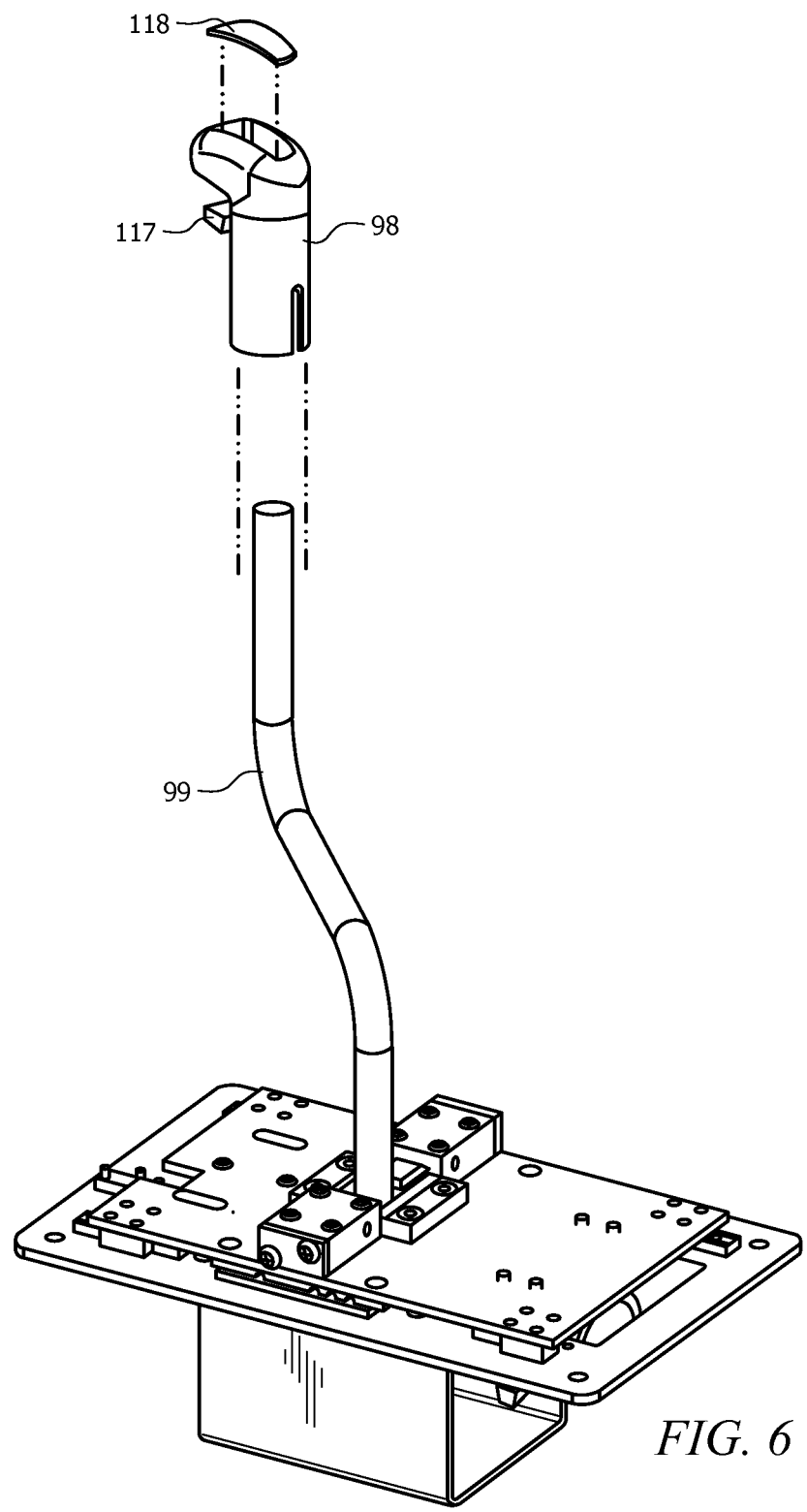
FIG. 6 illustrates a perspective view of the shifting training sub-system showing the handle connection.
Figure 7:
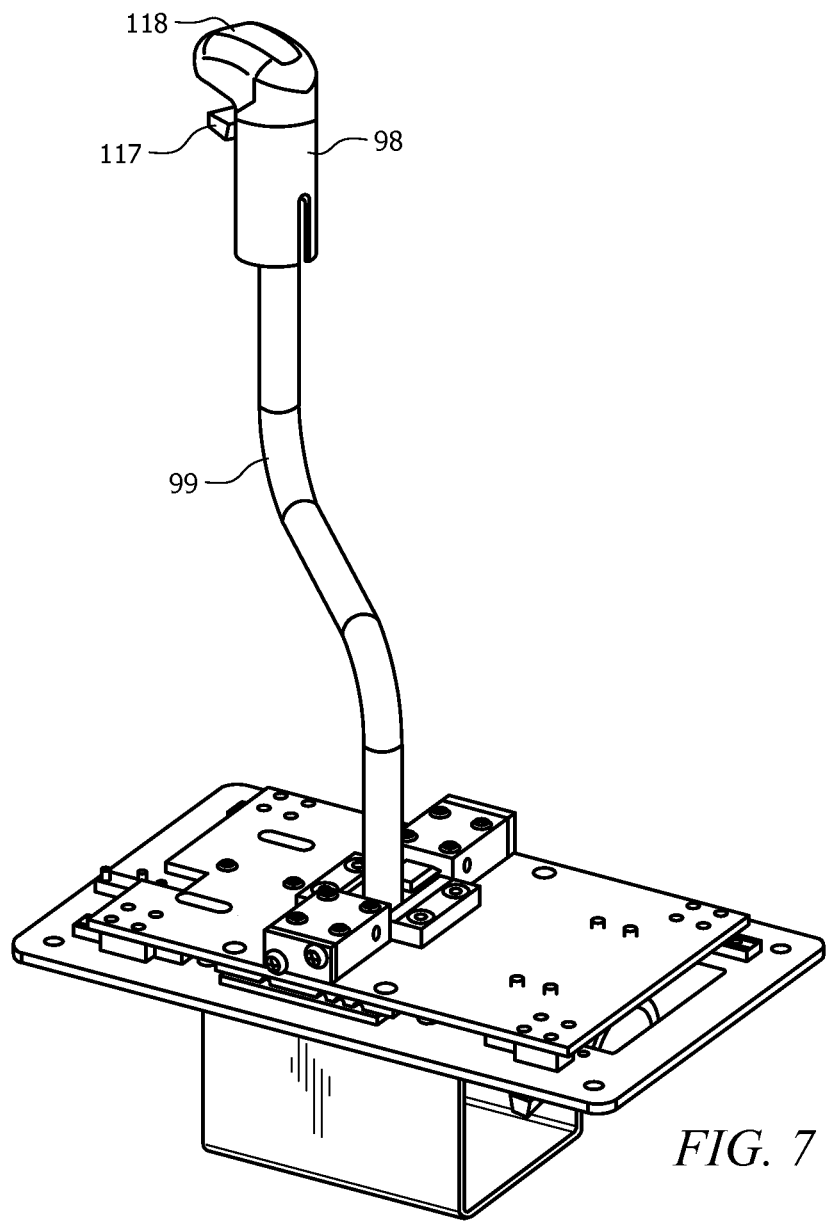
FIG. 7 illustrates another perspective view of the shifting training sub-system.

In a position similar to that of a dashboard of the target vehicle is a dashboard (e.g. display) 14 (details of an exemplary dashboard 14 are shown in FIG. 3). The dashboard 14 contains displays and indicators that inform the trainee of various target vehicle and external conditions such as speed, engine speed (RPM), engine temperature, outside temperature, brake temperature, air pressure, oil pressure, etc. In some embodiments, the dashboard 14 is fabricated from actual meters, indicators, etc, as in the target vehicle. In a preferred embodiment, the dashboard 14 is a graphics display on which the meters, indicators, etc of the target vehicle are displayed/simulated. It is also preferred that each sub-component of the dashboard 14 is touch-sensitive. In such, the training system 10 prompts the trainee 5 to, for example, "touch" the tachometer, and the training system 10 receives a signal corresponding to the sub-component/icon that the trainee 5 touches. In embodiments in which the dashboard 14 is a graphics display, it is anticipated that the graphics display is touch-sensitive such that a touch over a displayed sub-component signals the training system 10 of the location touched, and therefore, the identification of the sub-component that is touched. In embodiments in which the dashboard 14 is fabricated from actual meters, indicators, etc, some or all sub-components have touch sensors such as pressure detectors or capacitive touch sensors, etc.

In some embodiments, one or more side-view mirror displays 42/44 are mounted on or in the cabinet 8. When provided, the side-view mirror displays 42/44 show a simulated view of what is visible to the trainee 5 such as vehicles being passed and/or approaching vehicles. In some embodiments, the side-view mirror displays 42/44 display objects as they would appear in a real side-view mirror simulating concave or convex mirrors as appropriate. Additionally, in some embodiments, the image displayed includes simulated dirt, etc, as often occurs in real life.

In some embodiments, a center-mounted rear-view display 43 is also provided (not shown). When provided, the rear-view mirror display 43 shows a simulated view of what is visible to the trainee 5 such as approaching vehicles and/or oncoming vehicles.

In some embodiments, an information display and input device 16 is provided. The information display and input device 16 does not simulate something from the target vehicle. Instead, the information display and input device 16 presents menus, status information, and auxiliary information to the trainee 5 and accepts inputs such as scenario selection, study chapter selection, login data, etc.

In some embodiments, an audio system 18 is provided to enhance realism and provide simulations of sounds that are normally heard when operating the target vehicle such as engine noise, tire noise, other vehicles, rain or sleet hitting the target vehicle, emergency vehicles, sounds of a collision, etc.

In some embodiments, one or more trainee sensors 13 are provided to detect various aspects of the trainee 5 such as position upon the seat 20, head angle, attention, drowsiness and where the trainee is looking. This information is used to make sure the trainee is properly performing the task at hand. The trainee sensors 13 are, for example, cameras, light detectors, ultrasonic transducers, or any other detector as known in the industry. The trainee sensors 13 are coupled to the main computer 100 (see FIG. 9). The main computer 100 analyzes images from the trainee sensor(s) 13 to determine what the trainee 5 is doing and/or where the trainee 5 is looking to provide feedback to the trainee 5 and evaluate the trainee's abilities (e.g. the camera(s) 13 are used to determine if the trainee 5 looked in the right mirror display 42 before changing lanes).

Figure 2:
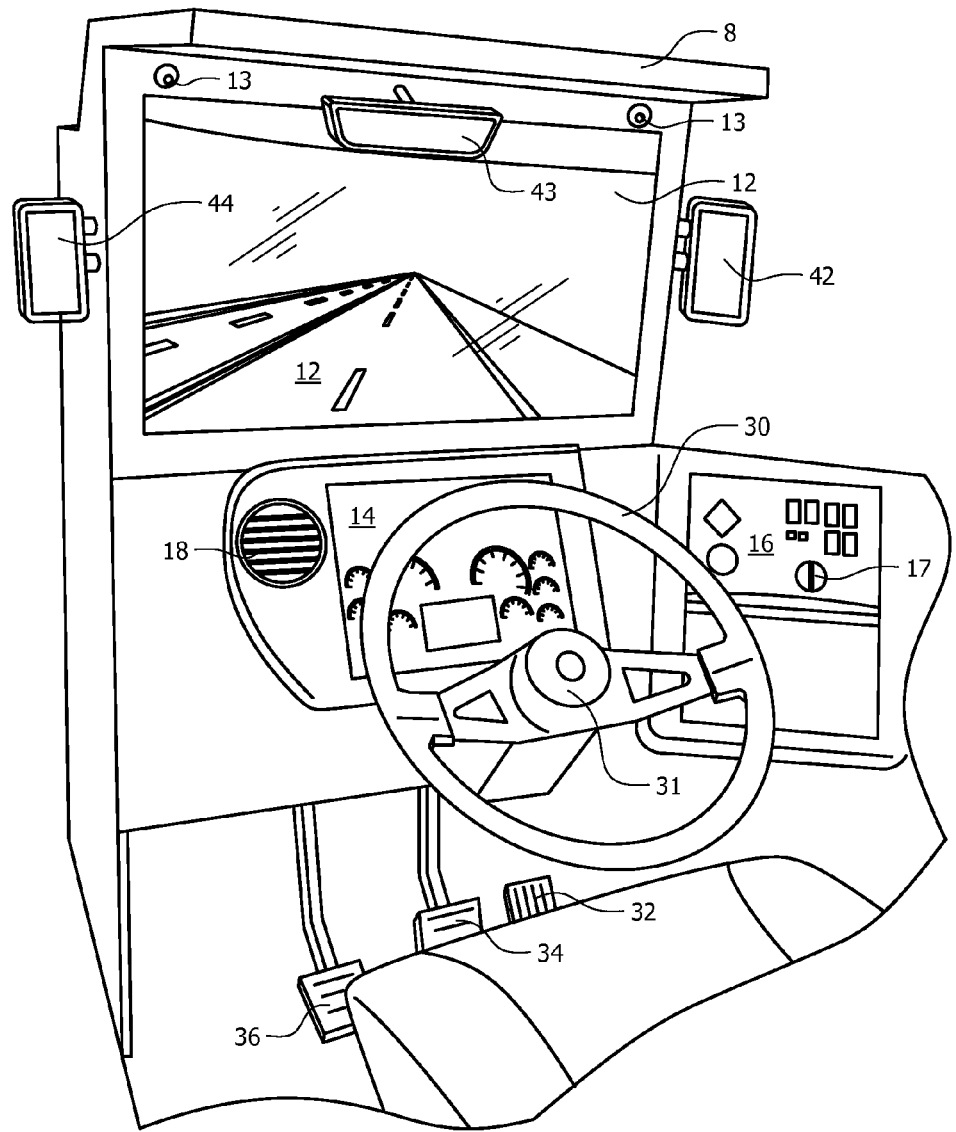
FIG. 2 illustrates a second perspective view of a training system.

Referring to FIG. 2, a second perspective view of a training system is shown. In this view, an optional centrally-located rear-view mirror display 43 is shown above the windshield display 12. When provided, the rear-view mirror display 43 shows a simulated view of what is visible to the trainee 5 such as vehicles being passed and/or approaching vehicles. In some embodiments, one, two or three mirror displays 42/43/44 are provided.

In FIG. 2, the information display and input device 16 is shown with greater detail. This display does not necessarily simulate a feature of the target vehicle, but in some embodiments, does contain features that map to a feature of the target vehicle. In this example, the information display and input device 16 includes an ignition switch icon 17 that looks like the ignition switch of the target vehicle. Typically, the information display and input device 16 shows informational messages such as information regarding the current courseware segment or summaries of the last simulation (e.g. the trainee 5 hit two parked cars and knocked down one telephone pole, etc). In a preferred embodiment, the information display and input device 16 includes a touch screen. In such embodiments, the trainee 5 uses the touch capabilities to make selections and to select items as requested (e.g. "touch the ignition switch").

In some embodiments, the windshield display 12 is also touch sensitive. This provides even more capabilities for testing the trainee's 5 ability to identify environmental (e.g. roadway) objects such as signs, barriers, etc. For example, the trainee is asked to touch the stop sign or touch the lane in which is most appropriate for his/her vehicle, etc.

Again, in some embodiments, one or more trainee sensors 13 are integrated into the training system 10. The trainee sensors (e.g. camera or cameras) 13 are coupled to the main computer 100. The main computer 100 analyzes data from the trainee sensor(s) 13 to determine what the trainee 5 is doing and/or where the trainee 5 is looking to provide feedback to the trainee 5 and evaluate the trainee's abilities (e.g. the trainee sensor(s) 13 are used to determine if the trainee 5 looked in the right mirror display 42 before changing lanes). The trainee sensor(s) 13 are positioned as needed to determine the position, stance and view of the trainee 5.

Referring to FIG. 3, a plan view of an exemplary training system dashboard 14 is shown. The dashboard 14 contains displays and indicators that inform the trainee of various target vehicle internal and external conditions such as speed 54, engine speed (RPM) 52, engine temperature 56, outside temperature 58, battery voltage 60, air pressure 64, oil pressure 66, fuel reserve 68, oil temperature 70 etc. In some embodiments, the dashboard 14 is fabricated from actual meters, indicators, etc, as in the target vehicle (not shown). In a preferred embodiment, the dashboard 14 is a graphics display on which the meters, indicators, etc of the target vehicle are simulated by images (e.g. icons) of the respective components from the target vehicle. In this way, the dashboard 14 is reconfigurable between different target vehicles (e.g. some vehicles have more/less meters and more/less "idiot lights").

It is also preferred that each sub-component of the dashboard 14 is touch-sensitive. In the example of FIG. 3, the entire graphics display 14 is touch sensitive (touch panel as known in the industry) and, touching of any of the sub-components 52/54/56/58/60/62/64/66/68/70 signals the main computer 100 that the corresponding sub-components 52/54/56/58/60/62/64/66/68/70 was touched. This provides the capability of questions/response scenarios like, "touch the fuel gauge . . . " and detection of the icon (sub-component 52/54/56/58/60/62/64/66/68/70) that was touched.

In some embodiments, status or identification information 50 is provided on the dashboard 14 such as the vehicle details and, perhaps, the name of the trainee 5, etc.

Referring to FIGS. 4 through 8, views of a shifting training sub-system 70 are shown. The shifting training sub-system 70 includes a transmission simulation section 80, a shaft 99 and a handle 98. In some embodiments, a touch detector 118 is provide on the handle 98 for detecting if a hand of the trainee 5 is touching the shifter handle 98, for example, a capacitive sensing detector 118.

The transmission simulation section 80 is preferably a two plate design. The transmission simulation section 80 includes a top plate 103 and the bottom plate 104. The top plate 103 and the bottom plate 104 allow travel of the shifter in the "Y" direction. One or more linear bearing(s) 140/142 enable movement of the top plate 103 relative to the bottom plate 104 in the "Y" direction for a limited distance. This provides the "Y" direction travel for the shifter shaft 99.

When the top plate 103 moves relative to the bottom plate 104, a spring loaded "Y" ball detents 114 provide several natural stopping locations similar to those of the transmission of the target vehicle. The "Y" ball detent 114 and the "Y" detent grooves 115 provide the natural stopping locations as well as simulated increase and release of force when shifting into simulated gear positions. The spring loaded "Y" ball detent plungers 114 provide a simulated feel of gear engagement as shift handle 98 and arm 99 are pushed.

Located on the bottom plate 104 is a transmission lock out solenoid 116. A movable core of this computer controlled transmission lock out solenoid 116 engages with the top plate 103, locking the top plate 103 in position over the bottom plate 104 under control of the computer 100. This provides simulated limited "Y" movement and simulates gear change restrictions and also provides an actuator system that locks the operator out of gear if a shift operation is missed.

Attached (e.g. by screws 145) to the bottom plate 104 is an H-gate 109. The H-gate 109 limits the "X" direction travel of the shifter shaft 99. A shift arm guide 110 mesh into detents 147 of the H-gate 109. Only certain combinations of positions of X and Y displacements are allowed by the H-gate 109 and shift arm guide 110. This provides limits to total travel of the shift arm guide 110 by amounts limited by the combination of the X and Y travel and in appropriate simulated shifting patterns.

The transmission top plate 103 also includes the transducer system 106. The transducer system 106 outputs noise and vibration to simulate gear box noise and vibration. This transmission noise and vibrations are conducted through parts of the transmission shaft 99 to provide the feel of an actual transmission in an operating target vehicle.

The transmission top plate 103 also includes the two transmission spring loaded detents 107 (left) and 108 (right). The spring detent includes an initial load detent 113. The initial load detent 113 provides a preload to the initial force required for movement of the shifting shaft 99. This initial load detent 113 is applied to the right 108 and/or left 107 spring loaded detents. The purpose of the detents is to simulate the force and feel of a manual transmission.

Optionally, a pneumatic range switch 117 and a pneumatic splitter switch (not visible) are provided on the shifter handle 98, mounted on the top portion of the shifter shaft 99. The operation/position of the pneumatic range switch 117 and the pneumatic splitter switch 118 are detected by the ranged switch detector 119 are communicated to the computer 100. These simulate the range and splitter switch for a manual transmission. The position of these switches is used by the training system 10 during various driving scenarios.

A "Y" position sensor 121 and a "X" position sensor 122 are located on the bottom plate 104. The "Y" position and "X" position of the shaft 99 are communicated to the computer 100 by the "Y" position sensor 121 and "X" position sensor 122 respectively.

Located in or on the shifter handle 98 is a hand position sensor 118. The hand position sensor 118 detects if the trainee's 5 hand is in proximity to the top of the shifter shaft, providing the computer 100 with information regarding hand placement. In a preferred embodiment, the hand position sensor 118 is a proximity detector such as a capacitive or resistive sensor as known in the industry.

Figure 8:
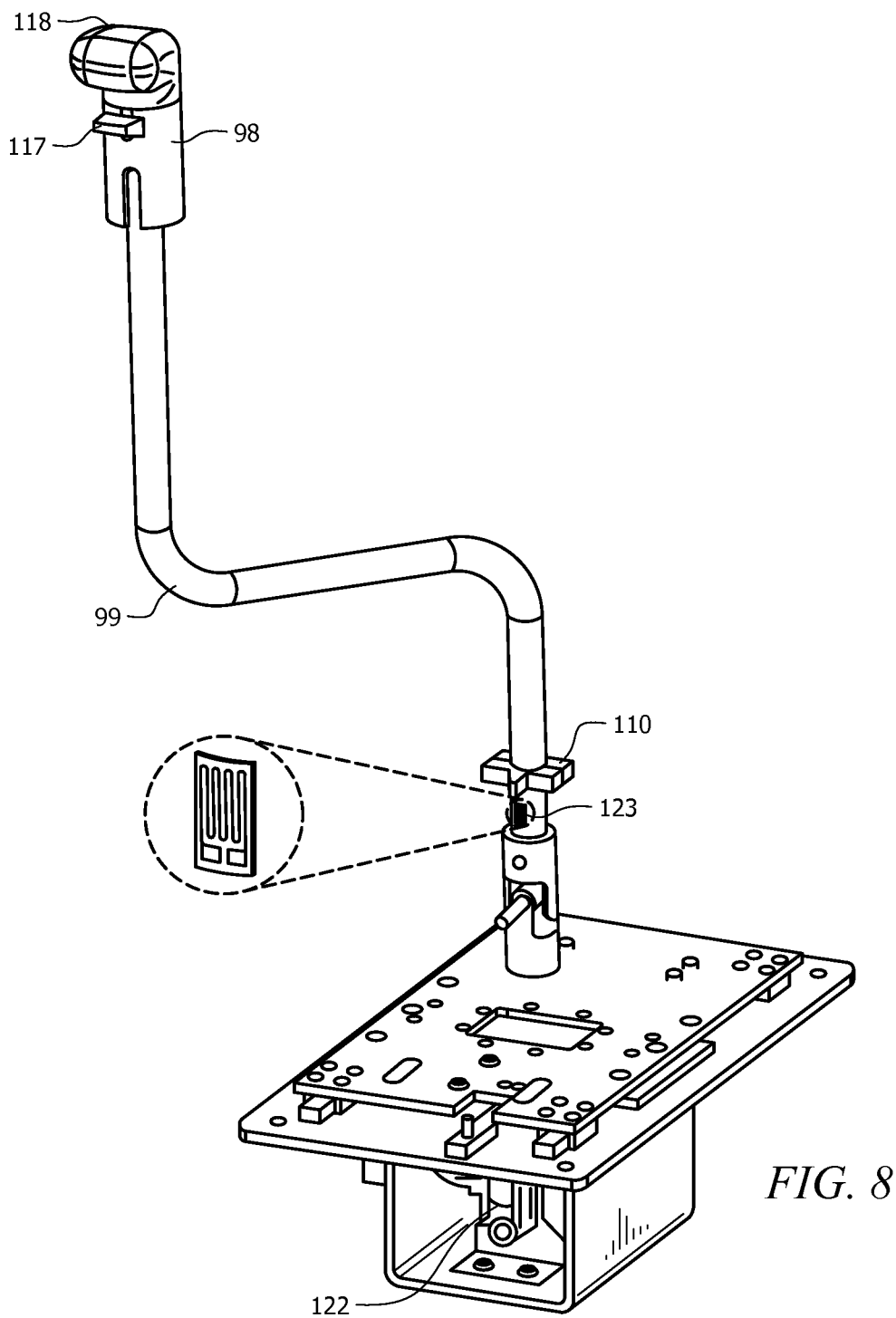
FIG. 8 illustrates a perspective view of the shifting training sub-system showing the force sensor.

Located on the lower portion of the shifter shaft 99 is a shaft force sensor 123 (FIG. 8). The shaft force sensor 123 provides a signal to the computer 100 indicating an amount of force exerted on the shaft by the trainee 5. When an excessive force is determined (e.g. an over load condition), the computer 100 signals an alarm (e.g. audio signal over the audio system 18).

Figure 9:
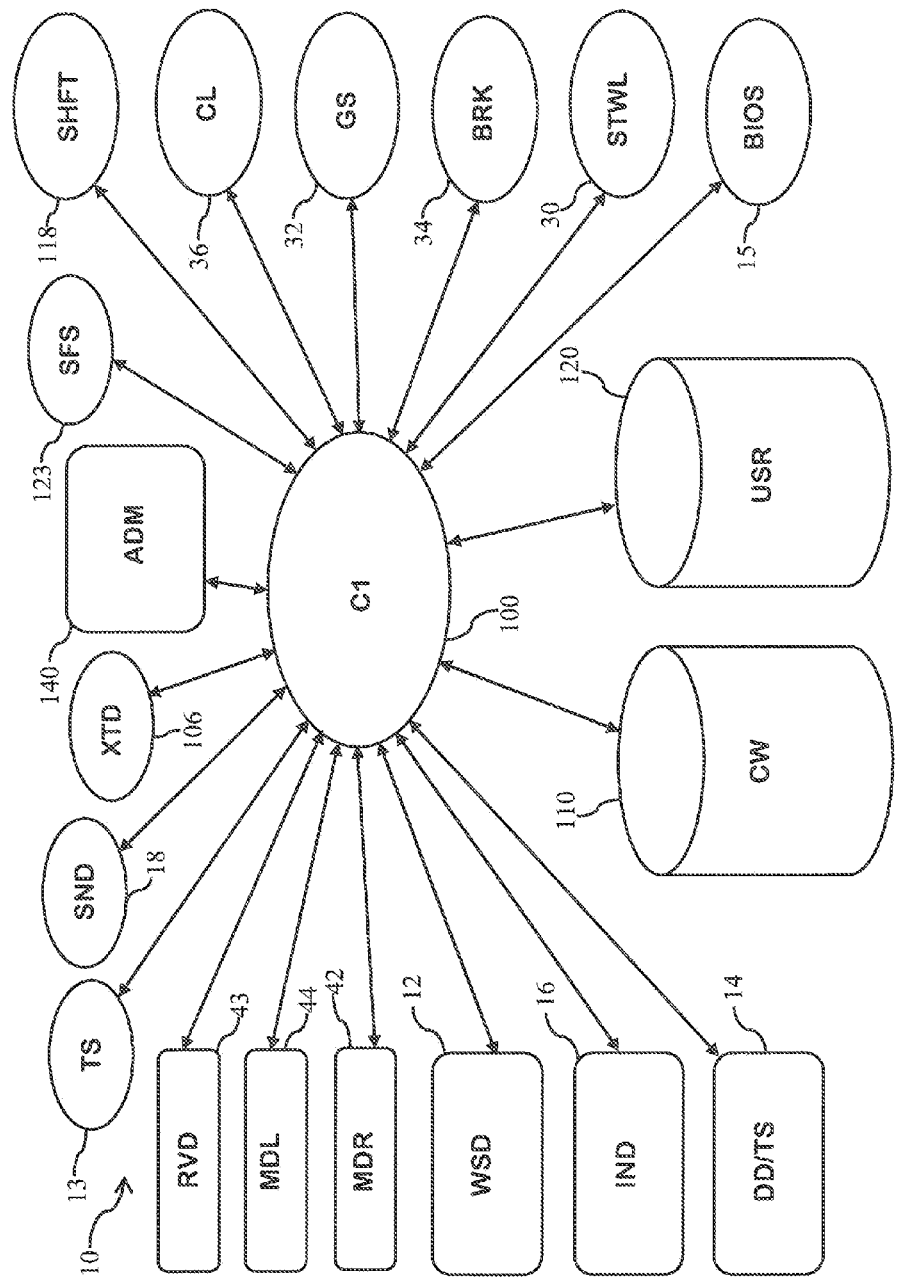
FIG. 9 illustrates a schematic view of an exemplary training system.

Referring to FIG. 9, a schematic view of an exemplary training system is shown. As discussed prior, it is anticipated that one or more of the following described features is or is not present in all embodiments. For example, in some embodiments, there is no trainee sensor 13 that determines where the trainee 5 is looking, etc.

Central to the training system 10 is a computer 100. Many different types of computers 100 are anticipated such as personal computers, dedicated computers and server computers. It is anticipated that computers 100 of one training system 10 are connected by local or wide area networks to other training systems 10 and/or to central data collection and control systems (not shown). In some embodiments, the computer has a motherboard with multiple PCI-Ex16 slots that provide multiple simulator display channels with 2D and/or 3D capability. A video processor card is optionally installed in each of these slots. The video cards run the simulation in multi channel mode with low transient delay times. It is anticipated, though not required, that a single image generator (single motherboard computer) can drive multiple displays. Although any number of display channels is anticipated, the training system typically is configured with from 3 to 8 real time interactive screens.

The computer 100 includes, in some embodiments, a display device or terminal device 140. This device 140 has a display screen, a keyboard and/or a touch screen and is primarily used by an administrator to operate the computer 100, for example, performing backups and other system administration function. In some embodiments, these functions are performed using one or more of the other components/displays 12/14/16.

The computer 100 also includes persistent storage 110/120 such as hard drives, flash memory, etc. for storage of, for example, courseware 110 and user information 120. In a preferred embodiment, the persistent storage 110/120 is one or more hard drives or solid-state drives. In some embodiments, the storage 110/120 is a raid system to provide more reliable data storage.

Interfaced to the computer 100 are several components of the training system 10. The windshield display 12, dashboard (e.g. dashboard graphics display and touch screen) 14 and information display 16 are all interfaced to the computer 100 as known in the industry. The mirror displays 42/43/44 (when present) are also interfaced to the computer 100 as known in the industry. All specialized hardware devices such as the shifter touch detector 118 (also the X-position, Y-position, switch status not shown for brevity reasons), clutch (position and force) 36, gas pedal (position and force) 32, brake pedal (position and force) 34 and steering wheel (rotation and touch) 30 are also interfaced to the computer 100 as known in the industry. It is preferred that some or all of such interfaces are bi-directional to provide control of the device (e.g. vary the counter-force of the brake pedal 34 or gates of the transmission 80) and to receive feedback from the device (e.g. sufficient pressure was applied to the brake pedal 34, hands are on the steering wheel 30 or the trainee 5 successfully shifted from first gear into second gear).

In embodiments that have trainee sensors 13 such as cameras, etc, the trainee sensors 13 are interfaced to the computer 100 as known in the industry.

In embodiments that have hand proximity sensors 118 (on shifter handle 98, the hand proximity sensors 123 are interfaced to the computer 100 as known in the industry.

In embodiments that have shifter force sensors 123 (on shifter shaft 99, the shifter force sensors 123 are interfaced to the computer 100 as known in the industry.

In some embodiments, one or more biometric sensors 15 are interfaced to the computer 100. The biometric sensors 15 sense, for example, fingerprints, retina, face characteristics, etc, of a user of the training system 10 to make sure the training and results correspond to the correct trainee 5, thereby preventing one trainee 5 from intentionally or unintentionally scoring/learning for another trainee 5.

In embodiments having a sound system 18, the sound system 18 is interfaced to the computer 100 as known in the industry such as audio outputs connected to amplifiers and speakers, TOSLINK, USB, etc.

Figure 12:
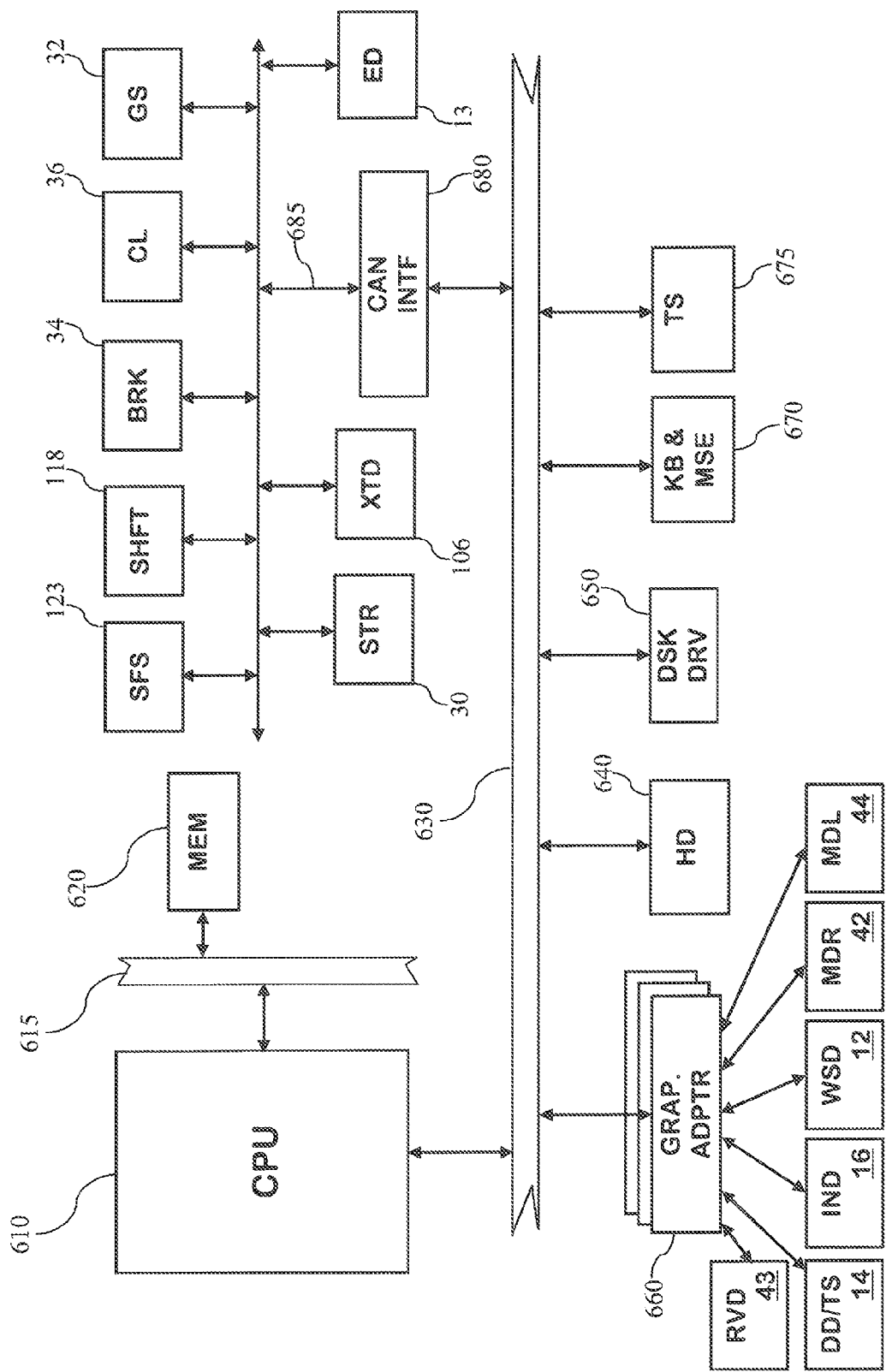
FIG. 12 illustrates a schematic view of a typical computer system.

In embodiments having a transmission transducer 106, the transmission transducer 106 is interfaced to the computer 100 as known in the industry such as through audio outputs connected to amplifiers and speakers, TOSLINK, USB, etc or over a local area network (see FIG. 12).

Figure 10:
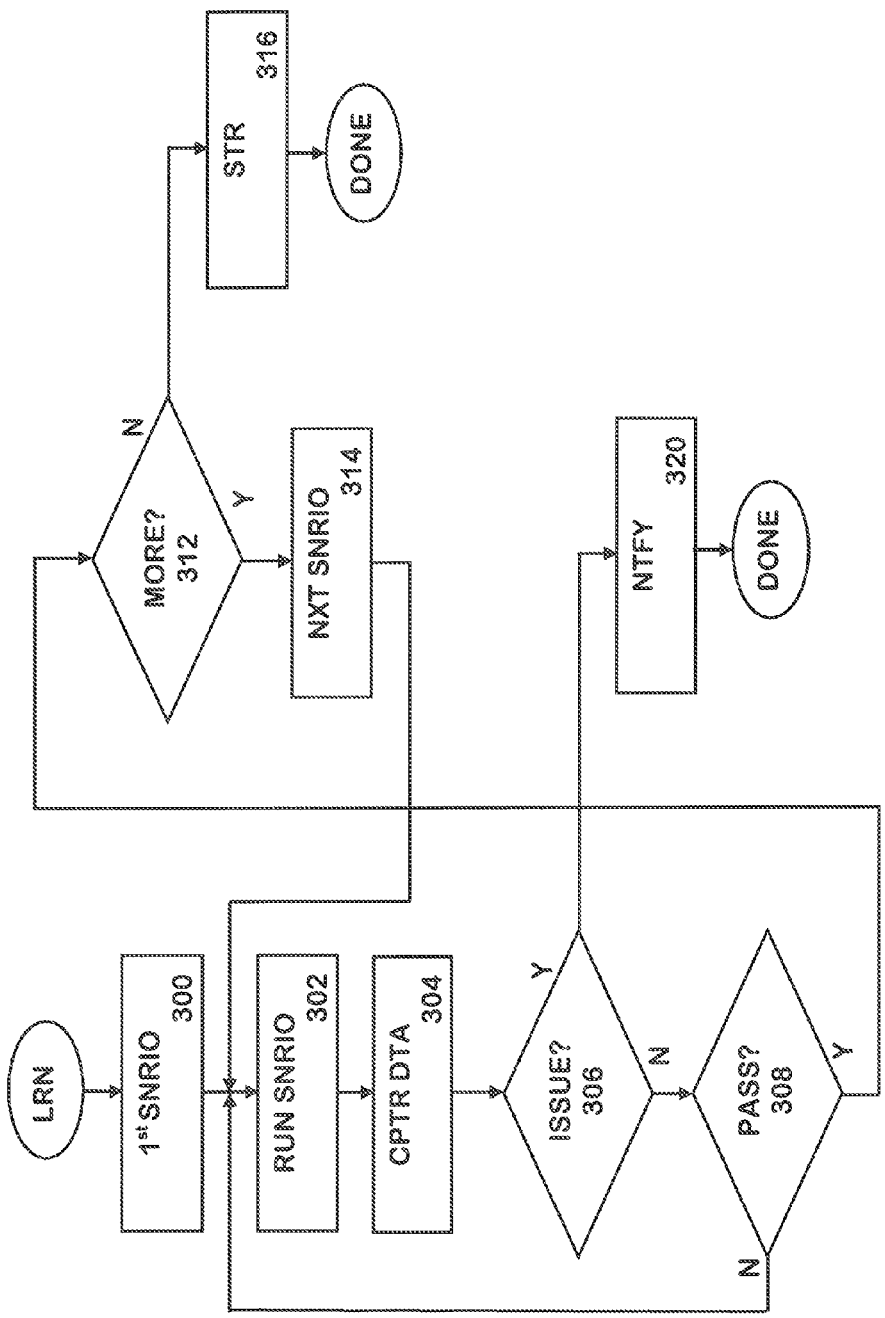
FIG. 10 illustrates a flow chart of the prior art.

Referring to FIG. 10, a flow chart of a training model of the prior art is shown. This represents either one segment of a training method or the entire training method of the prior art. In it, a first scenario/segment is selected 300 then run 302 and data is captured 304 during and/or after the scenario/segment is run. An example of a simple scenario/segment is a simulation of driving down a road way, approaching an unmarked intersection and a vehicle pulls out from the intersection into the path of the trainee 5. If the captured data indicates a major issue occurred 306 such as the trainee 5 didn't apply the brakes, records are made and the appropriate training personnel are notified 320.

The data is analyzed 308 to determine the performance of the trainee 5 in the given scenario/segment meets passing requirements. If not, the scenario/segment is repeated 302/304/306/308. If the trainee 5 meets passing requirements 308, it is determined if there are more scenarios/segments 312 for the trainee 5 (e.g. scenarios/segments are often grouped in chapters and the trainee 5 is finished when he/she complete a chapter, etc). If there are more scenarios/segments 312, the next scenario/segment is retrieved 314 and the above steps 302/304/306/308/312 are repeated until there are more scenarios/segments planned for the trainee 5 and the captured data is stored 316 for progress analysis, grading, etc.

The methods of the prior art do not adapt to the trainee's 5 demonstrated abilities, running scenarios/segments sequentially, independent of any progress that the trainee 5 has made. For example, in a set of scenarios/segments are crafted to teach defensive driving, offending vehicles are displayed moving into the path of the trainee 5. If the trainee 5 demonstrates excellent responses to each of the first few scenarios/segments, the latter scenarios/segments are still presented, often boring the trainee 5. Similarly, if the trainee 5 shows a weakness in a certain operation such as double-clutching, the prior art would only repeat the scenarios/segments until the trainee 5 is able to pass that segment. In the later situation, it is desirable to access other scenarios/segments that may have already been completed for extra training on the operation of which the trainee 5 is having difficulty. The prior art does not address such operation to adapt to the demonstrated abilities of the trainee 5.

Figure 11:
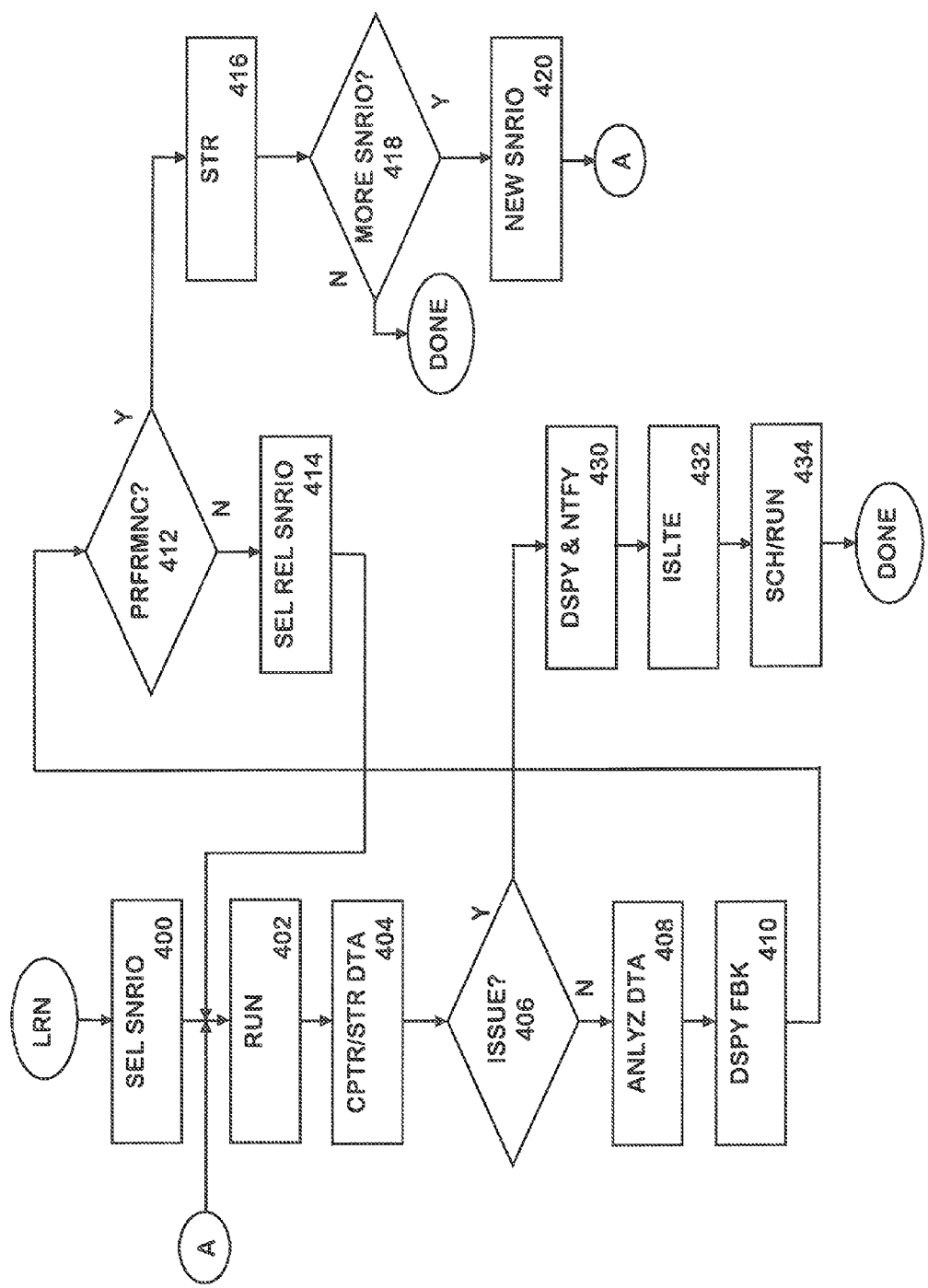
FIG. 11 illustrates a flow chart of the adaptive training system.

Referring to FIG. 11, a flow chart of the adaptive training system is shown. Typically, a chapter or portion of a training course (courseware 110) is presented in one session to the trainee 5. The methods disclosed monitory the demonstrated abilities (or lack thereof) of the trainee 5 and adapt the training course to such. In this, a first scenario/segment from the chapter is selected 400 then run 402. Data is captured 404 during and/or after the scenario/segment is run. An example of a simple scenario/segment is a simulation of driving down a road way, approaching an unmarked intersection and a vehicle pulls out from the intersection into the path of the trainee 5. If the captured data indicates a major issue occurred 406 such as the trainee 5 didn't apply the brakes, records are made and the appropriate training personnel are notified 430. In some situations in which a major issue occurred 406, the driver is notified on one or more of the displays 12/14/16, preferably the information display 16. As part of the adaptive process, elements that led up to the major issue are isolated/determined 432 and, as necessary, prior scenarios/segments or chapters are presented 434 to the trainee 5 to fortify the trainee's abilities on these elements. For example, if the trainee 5 didn't apply the brakes correctly because the trainee 5 was having trouble downshifting, then the scenarios/segments or chapters related to double clutching are scheduled to be repeated for that trainee 5 or are selected and run.

If no major issue is identified 406, the data is analyzed 408 to determine the performance of the trainee 5 in the given scenario/segment meets passing requirements and information is displayed 410 to the trainee 5 on one or more of the display devices 12/14/16. If the performance indicates that the trainee 5 didn't perform the task sufficiently 412, a new scenario/segment is selected 414. The new scenario/segment is selected 414 based upon elements of the prior scenario/segment that were not adequately performed. Since the method is adaptive, the method uses any existing or modified scenario/segment to fortify the element that was not adequately performed. For example, if the trainee 5 avoided the collision but the trainee 5 didn't step on the clutch while applying the brakes, therefore stalling the engine, one or more scenarios/segments or chapters related to proper use of the clutch while braking are selected 414 to be presented to the trainee 5 either during the current session or during a future session.

If the trainee's 5 performance meets passing requirements 412, the data (e.g. results) are stored 416 for later reporting/analysis/grading and it is determined if there are more scenarios/segments 418 for the trainee 5 (e.g. scenarios/segments are often grouped in chapters and the trainee 5 is finished when he/she complete a chapter, etc). If there are more scenarios/segments 418, the next scenario/segment is retrieved 420 and the above steps 402-418 are repeated until there are more scenarios/segments planned for the trainee 5.

The methods of the prior art do not adapt to the trainee's 5 demonstrated abilities, running scenarios/segments sequentially, independent of any progress that the trainee 5 has made. For example, in a set of scenarios/segments are crafted to teach defensive driving, each presenting offending vehicles moving into the path of the trainee 5, if the trainee 5 demonstrates excellent responses to each of the first few scenarios/segments, the latter scenarios/segments are still presented, often boring the trainee 5. Similarly, if the trainee 5 shows a weakness in a certain operation such as double-clutching, the prior art would only repeat the scenarios/segments until the trainee 5 is able to pass that segment. In the later situation, it is desirable to access other scenarios/segments that may have already been completed for extra training on the operation of which the trainee 5 is having difficulty. The prior art does not address such operation to adapt to the demonstrated abilities of the trainee 5. The present invention addresses these and other shortcomings of the prior art through adapting to the trainee's 5 demonstrated abilities to determine which segments/scenarios need to be presented or re-presented next or in the future. In some embodiments, the segments/scenarios are marked for review to be re-presented during another session. In some embodiments, the data is stored and the next time the trainee 5 accesses the training system 10, the training system 10 analyzes the data to determine the more meaningful segments/scenarios that need be run to concentrate on areas that are the weakest, etc.

Referring to FIG. 12, a schematic view of a typical computer 100 is shown. The example computer 100 represents a typical computer system used as the heart of the training system 10. The example computer 100 is shown in its simplest form, having a single processor. Many different computer architectures are known that accomplish similar results in a similar fashion and the present invention is not limited in any way to any particular computer system. The present invention works well utilizing a single processor system, a multiple processor system where multiple processors share resources such as memory and storage, a multiple server system where several independent servers operate in parallel (perhaps having shared access to the data or any combination). In this, a processor 610 is provided to execute stored programs that are generally stored for execution within a memory 620. The processor 610 can be any processor or a group of processors, for example an Intel Pentium-4® CPU or the like. The memory 620 is connected to the processor in a way known in the industry such as by a memory bus 615 and is any memory 620 suitable for use with the selected processor 610, such as SRAM, DRAM, SDRAM, RDRAM, DDR, DDR-2, flash, FEROM, etc.

Also connected to the processor 610 is a system bus 630 for connecting to peripheral subsystems such as a network interface (not shown), a persistent storage (e.g. a hard disk, semiconductor storage such as flash, a raid system, etc) 640, a disk drive (e.g. DVD) 650, one or more graphics adapters 660, a keyboard/mouse 670 and/or one or more touch screen interfaces 675. The graphics adapter(s) 660 receives commands and display information from the system bus 630 and generates a display image that is displayed on one or more of the graphic display devices 12/14/16/42/43/44.

In general, the hard disk 640 may be used to store programs, executable code and data (e.g. courseware 110 and user data 120) persistently. For data security and reliability, in some embodiments, the hard disk 640 is multiple disks or a raid system, etc. The removable disk drive 650 is often used to load CD/DVD/Blueray disks having programs, executable code and data onto the hard disk 640. These peripherals are examples of input/output devices, persistent storage and removable media storage. Other examples of persistent storage include core memory, FRAM, flash memory, etc. Other examples of removable disk drives 650 include CDRW, DVD, DVD writeable, Blueray, compact flash, other removable flash media, floppy disk, etc. In some embodiments, other devices are connected to the system through the system bus 630 or with other input-output connections. Examples of these devices include printers; graphics tablets; joysticks; audio components; and communications adapters such as modems and Ethernet adapters.

Although there are many ways anticipated for connecting training system components 13/30/32/34/36/106/118/123 to the processor, one preferred interface is a bi-directional local area network such as Car Area Network (CAN) 685 connected to the bus 630 by a Car Area Network (CAN) interface 680 as known in the industry. Any connection scheme to the system components 13/30/32/34/36/106/118/123 is anticipated including direct wiring, any local area network (e.g. Ethernet, CAN or VAN) and wireless (e.g. BlueTooth).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for driver training comprising:
a computer;
at least two graphics displays, a first graphics display of the graphics displays simulates a windshield of a target vehicle and a second graphics display of the graphics displays simulates a dashboard of the target vehicle;
a touch screen interface is integrated with the second graphics display, the touch screen interface is operatively coupled to the computer thereby signaling the computer with positions at which the second graphics display is touched by a trainee; and
software running on the computer presents a simulation of operating the target vehicle to the trainee, the software presents motion video on the first graphics display and presents the dashboard of the target vehicle on the second graphics display, the dashboard including icons that resemble dashboard features;
the software monitors performance of the trainee with respect to the simulation of the target vehicle and, if the software detects a performance issue of the trainee, the software requests that the trainee select a particular icon of the icons and the software provides feedback to the trainee indicative of whether the particular icon is selected by the trainee.

2. The system for driver training of claim 1, wherein icons of gauges are displayed on the second graphics display.

3. The system for driver training of claim 2, wherein software running on the computer prompts the trainee by a text message displayed on the graphics display that simulates the windshield of the target vehicle to touch one of the icons and the software reads signals from the touch screen interface and determines whether the associated icon was touched on the graphics display that simulates a dashboard of the target vehicle.

4. The system for driver training of claim 3, wherein the one or more graphics displays includes an information display and whereas a message is displayed on the information display telling the trainee to touch a specific icon of the icons and the computer determines if the specific icon was pressed based upon inputs from the touch screen interface.

5. The system for driver training of claim 1, further comprising one or more input/output devices selected from a group consisting of a simulated transmission force detector, a simulated transmission touch detector, a simulated transmission pressure sensor, a steering wheel touch detector, and a trainee position detector.

6. A method of training a trainee regarding a dash board layout, the method includes:
providing a training system comprising a computer, a dashboard graphics display, an information graphics display and a windshield graphics display, the dashboard graphics display includes a touch screen interface that is operatively coupled to the computer, thereby sending signals to the computer indicative of where a touch is made on the dashboard graphics display;
displaying a plurality of icons on the dashboard graphics display, the icons representing gauges, indicators and/or data of a dashboard of a target vehicle;
presenting a simulation scenario on the windshield graphics display in conjunction with the dashboard graphics display, monitoring responses of a trainee;
if the responses indicate an error was made, stopping the simulation scenario and presenting instructional training on any or all of the dashboard graphics display, the information graphics display, and/or the windshield graphics display, the training including prompting by the computer for the trainee to touch one of the icons by a message on the information graphics display, the computer reading a set of coordinates from the touch screen interface corresponding to a location of the dashboard graphics display touched by the trainee, and the computer comparing the set of coordinates to a location of the icon on the dashboard graphics display and the computer determining if the trainee touched the correct icon, thereby determining if the trainee understands the icons.

7. The method of claim 6, wherein the instructional training is displayed on the information graphics display by the computer.

8. The method of claim 6, further comprising one or more input/output devices interfaced to the computer, the one or more input/output devices is selected from a group consisting of a simulated transmission force detector, a simulated transmission touch detector, a simulated transmission pressure sensor and a trainee position detector.

9. A system for driver training comprising:
a computer;
at least two graphics displays, a first graphics display of the graphics displays simulates a windshield of a target vehicle and a second graphics display of the graphics displays simulates a dashboard of the target vehicle;
means for presenting a simulation on the first and second graphics display by the computer;
means for evaluating, by the computer, responses to the simulation; and
responsive to errors in the responses to the simulation, means for presenting instructional training on any or all of the first graphics display, the second graphics display and/or a third graphics display, the instructional training including displaying icons on the second display representative of gauges, indicators, and/or controls; the instructional training also requesting identification of one of the icon that is displayed on the second graphics display and means for determining where a trainee touches the second graphics display, the means for determining is operatively coupled to the computer thereby signaling the computer with coordinates of where the second graphics display is touched by the trainee.

10. The system for driver training of claim 9, wherein a touch over one of the icons signals the computer that the associated icon was touched.

11. The system for driver training of claim 10, wherein the means for presenting instructional training displays the instructional training on the first display.

12. The system for driver training of claim 10, wherein the means for determining where the trainee touches is a touch screen integrated into the second graphics display.

13. The system for driver training of claim 10, wherein the means for determining where the trainee touches includes one or more image sensors, the image sensors aimed at the second graphics display.

14. The system for driver training of claim 10, further comprising one or more input/output devices selected from a group consisting of a simulated transmission force detector, a simulated transmission touch detector, a simulated transmission pressure sensor, a steering wheel touch detector, and a trainee position detector.

15. The system for driver training of claim 9, further comprising software running on the computer, the software prompts the trainee to touch one of the icons and the software reads signals from the means for determining and the software determines whether the associated icon was touched.

16. The system for driver training of claim 1, wherein the software operates the computer in two modes, a first mode where the system performs a simulation and a second mode where the system performs training.

17. The system for driver training of claim 16, wherein after the software prompts the trainee to touch one of the icons and the software determines whether the associated icon was touched, the software presents remedial training if a wrong icon was touched.

* * * * *